United States Patent Office 2,994,225
Patented Aug. 1, 1961

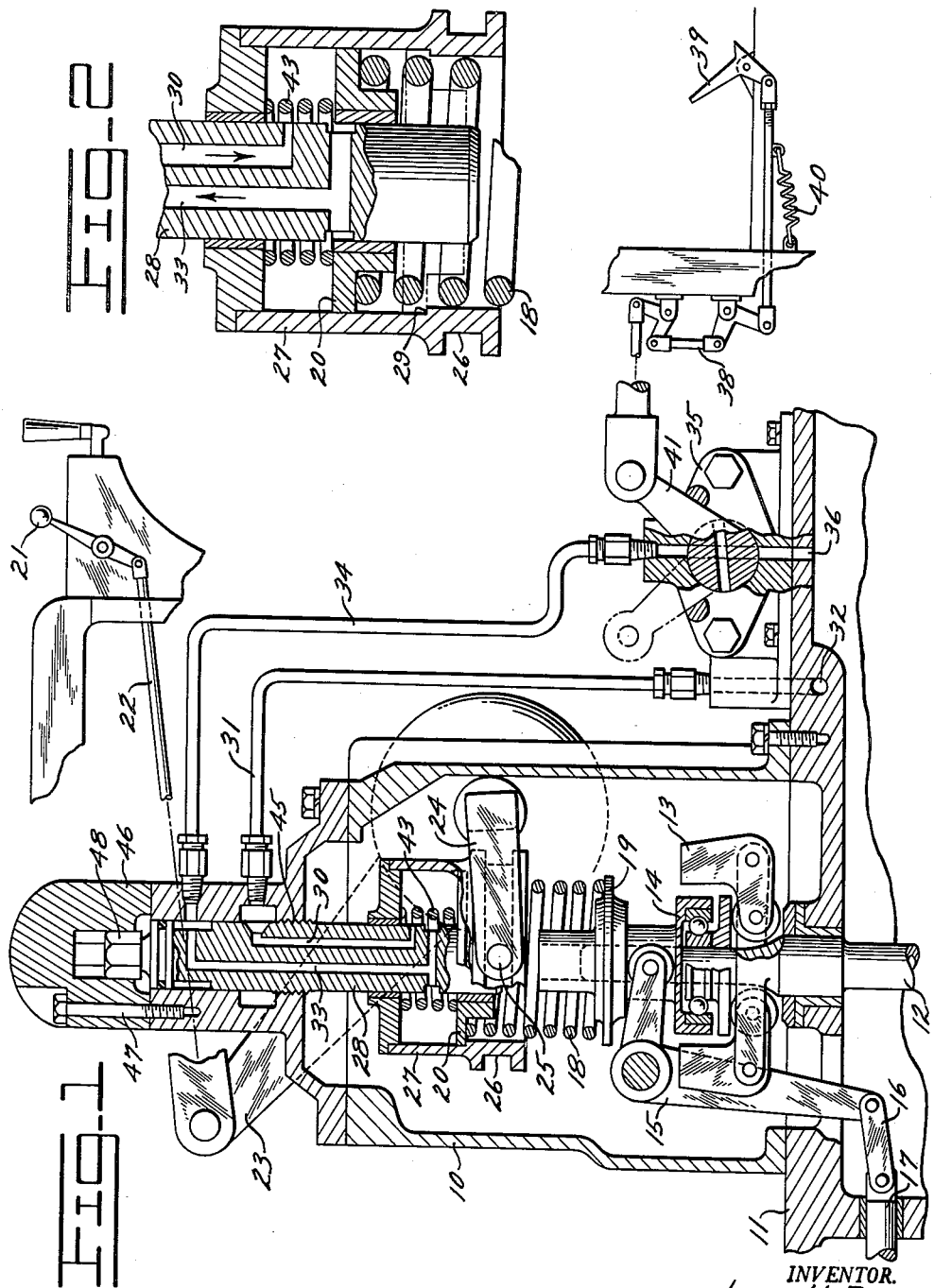

2,994,225
HYDRAULICALLY CONTROLLED DECELERATOR FOR ENGINE GOVERNOR
John H. Parks, Peoria, Ill., assignor to Caterpillar Tractor Co., Peoria, Ill., a corporation of California
Filed Apr. 6, 1959, Ser. No. 804,386
5 Claims. (Cl. 73—523)

This invention relates to decelerators for engine governors and particularly to decelerators of the type which are usually pedal operated to enable the operator of a tractor or other large engine powered machine to decelerate the engine quickly and temporarily as the occasion requires without the necessity of manually adjusting the usual governor control lever.

The reason for employing auxiliary decelerators on tractors and similar machines is that the operation of the engine is customarily controlled by a hand throttle or governor control lever which is set for any desired engine speed. Frequently the hand throttle is set at full load position and due to a change in operating conditions such as a reduction in load, the necessity for shifting gears or the approach to another machine or load to be pushed temporary deceleration is required. These conditions may occur while the operator is negotiating a turn or where other circumstances require adjustments which occupy both hands making adjustment of the governor control lever impractical.

In the large machines presently used for earthmoving operations and the like, the governor spring forces are high so that the operator effort required to overcome these forces through mechanical linkage is correspondingly high and the results lack smoothness and stability. It is, therefore, an object of the present invention to provide an auxiliary decelerator for an engine governor in which hydraulic pressure, readily available from the engine lubricating oil supply, is employed to reduce the operator effort in actuating the decelerator.

A further object of the present invention is to provide a hydraulically controlled governor decelerator which provides high efficiency by maintaining a relatively stable governor action.

A still further object of the invention is to provide a decelerator of the kind described which is connected with the engine lubricating oil system in a manner to protect the engine by preventing operation thereof at maximum or high speed after it has been started until the pressure in the lubricating oil system is sufficiently high to assure adequate lubrication of the various parts of the engine served by the system.

Further and more specific objects and advantages of the invention are made apparent in the following description wherein reference is made to the accompanying drawing illustrating a preferred form which the invention may assume.

In the drawing:

FIG. 1 is a vertical, central sectional view through an engine governor of a conventional type with which the hydraulic decelerator of the present invention is employed, and FIG. 2 is an enlarged sectional view of a portion of the control shown in FIG. 1 with the parts assuming a different position.

In FIG. 1 of the drawings, a governor housing is illustrated at 10 as secured to a surface 11 of a part of the fuel injection mechanism of an internal combustion engine, not shown. The governor comprises a conventional spindle shown at 12 driven by the engine itself through gears, not shown, and carrying a pair of pivoted flyweights 13 which swing outwardly in response to engine speed to raise an anti-friction thrust collar 14 which through a lever 15 and link 16 actuates a fuel control member. In this case, the fuel control member is shown as a rack bar a portion of which appears at 17 and the function of which is to angularly adjust the scroll-type pistons of a set of fuel injection pumps to vary the fuel supply to the engine in a conventional and well-known manner.

Outward movement of the flyweights 13 tends to decrease the fuel supply and resistance to this outward movement is afforded by a main governor spring 18 of the compression type, one end of which engages a seat 19 formed integrally with the thrust bearing 14 and slidable therewith on the spindle 12. The opposite end, which in this case is the upper end, of the governor main spring 18 rests against a spring seat 20 which in accordance with conventional governor operation is raised and lowered to vary the load on the spring 18 and thereby vary the force required by the flyweights to reduce fuel supply to the engine. Variation of the position of the spring seat 20 is accomplished by a control lever 21 pivotally mounted adjacent the operator's station of the vehicle which is powered by the engine. Linkage herein represented as a rod 22 connects the control lever with a lever 23 on the governor mounted on a rockable shaft carrying a yoke 24 which embraces and has pins 25 disposed in a groove 26 on a member which controls the position of the spring seat 20.

In accordance with the present invention, the member which controls the spring seat 20 is in the form of a cylinder 27 vertically slidable on a post 28 supported by the top of the governor housing and extending downwardly thereinto in alignment with the spindle 12. The spring seat 20 is slidable within the cylinder 27 in the manner of a piston and its downward sliding movement is limited by a shoulder 29 in the cylinder best shown in FIG. 2. With this construction, liquid locked in the cylinder 27 above the spring seat 20 prevents sliding movement of the spring seat or piston in the cylinder so that adjustment of the main governor spring by means of the control lever 21 in the manner above described is possible.

Oil under pressure from the lubricating oil system of the engine is directed into the cylinder 27 through a passage 30 in the post 28 which communicates by means of a line 31 and passage 32 with a source of oil under pressure such as the lubricating pump of the engine, not shown. The governor with oil under pressure locked in the cylinder 20 functions in an entirely conventional manner and the present invention provides for releasing the oil from the cylinder 27 to permit the force of the main spring 18 to raise the seat 20 thereby reducing the load on the spring and decelerating the engine without disturbing the position of the control lever 21. To accomplish this, an outlet passage 33 is provided in the post 28 and this outlet passage communicates through a line 34 with a normally closed valve 35 capable of being opened to discharge the oil through a passage 36 in the fuel injection housing from which it eventually finds its way back to the engine oil sump. The valve 35 is connected by suitable linkage represented at 38 with a foot pedal 39 at the operator's station and a spring 40 normally tends to hold the valve in its closed position. Depression of the foot pedal 39 swings the operating lever 41 of the valve to the broken line position illustrated opening the valve and permitting escape of oil from the cylinder 27 to effect deceleration of the engine. A spring 43 interposed between the valve seat 20 and the inner end of the cylinder 27 together with the pressure of oil which continues to be fed into the cylinder through the passage 30 serve to cushion and limit the upward movement of the spring seat 20 so that it cannot close the open end of the passage 30 nor move upwardly sufficient to effect shut-down of the engine. Rather the engine will be adjusted only to low idle position and shut down can be accomplished only through manipulation of the control lever 21. Upon release of the pressure on the pedal 39, the spring 40 closes the valve 35 and oil under pressure entering the cylinder 27 returns the spring seat 20 downwardly toward its normal position.

The maximum governor spring loading is limited by the shoulder 28 which limits the compression of the spring and low idle position is controlled by the outlet of the discharge passage 33 which is arranged to encircle the post 28 as best shown in FIG. 2 wherein the spring seat 20 is disposed at its uppermost position just short of closing the outlet passage which closing is prevented by the pressure of oil entering through the passage 30 and the force of the spring 43. Adjustment of the range through which the deceleration takes place is, therefore, possible by adjusting the vertical position of the post 28 and this is accomplished through a threaded connection of the post with the top of the governor housing illustrated at 45 in FIG. 1. To effect such adjustment, a cap 46 normally secured in place as by cap screws, one of which is illustrated at 47, is removed so that a wrench may be aplied to a hexagon head 48 on the post for rotating it. The cap 46 includes a hexagon interior fitting the head 48 to prevent its accidental rotation.

I claim:

1. In an engine governor, a rotatable spindle driven by the engine, flyweights rotatable with the spindle and operable in response to engine speed to limit fuel supply to the engine, a governor spring concentric to the spindle and opposing the operation of the flyweights, a post coaxial with the spindle and spring, a cylinder slidable on said post toward and away from the spring, a piston in the cylinder forming a seat for the spring, means to maintain fluid under pressure in the cylinder whereby its movement toward the spring will load the spring to effect a selected engine speed, and means to relieve said pressure temporarily to relieve the load on the spring.

2. In an engine governor, a rotatable spindle driven by the engine, flyweights rotatable with the spindle and operable in response to engine speed to limit fuel supply to the engine, a governor spring concentric to the spindle and opposing the operation of the flyweights, a post coaxial with the spindle and spring, a cylinder slidable on said post toward and away from the spring, a piston in the cylinder forming a seat for the spring, means to maintain fluid under pressure in the cylinder whereby its movement toward the spring will load the spring to effect a selected engine speed, means to relieve said pressure temporarily to relieve the load on the spring, said means to maintain and relieve pressure in the cylinder including passageways extending through said post.

3. In an engine governor, a rotatable spindle driven by the engine, flyweights rotatable with the spindle and operable in response to engine speed to limit fuel supply to the engine, a governor spring concentric to the spindle and opposing the operation of the flyweights, a post coaxial with the spindle and spring, a cylinder slidable on said post toward and away from the spring, a piston in the cylinder forming a seat for the spring, means to maintain fluid under pressure in the cylinder whereby its movement toward the spring will load the spring to effect a selected engine speed, and means to relieve said pressure temporarily to relieve the load on the spring, said means to maintain and relieve pressure in the cylinder including passageways extending through said post and a pedal actuated valve controlling flow through one of said passageways.

4. In an engine governor, a rotatable spindle driven by the engine, flyweights rotatable with the spindle and operable in response to engine speed to limit fuel supply to the engine, a governor spring concentric to the spindle and opposing the operation of the flyweights, a post coaxial with the spindle and spring, a cylinder slidable on said post toward and away from the spring, a piston in the cylinder forming a seat for the spring, means to maintain fluid under pressure in the cylinder whereby its movement toward the spring will load the spring to effect a selected engine speed, and means to relieve said pressure temporarily to relieve the load on the spring, said means to maintain pressure in the cylinder including a passageway through the post terminating at a point to prevent movement of the piston and spring to an engine shut-down position.

5. In an engine governor, a rotatable spindle driven by the engine, flyweights rotatable with the spindle and operable in response to engine speed to limit fuel supply to the engine, a governor spring concentric to the spindle and opposing the operation of the flyweights, a post coaxial with the spindle and spring, a cylinder slidable on said post toward and away from the spring, a piston in the cylinder forming a seat for the spring, means to maintain fluid under pressure in the cylinder whereby its movement toward the spring will load the spring to effect a selected engine speed, means to relieve said pressure temporarily to relieve the load on the spring, said means to maintain pressure in the cylinder including a passageway through the post terminating at a point to prevent movement of the piston and spring to an engine shut-down position, and means to adjust the post in an axial direction to vary the speed of the engine upon relief of pressure in the cylinder.

References Cited in the file of this patent

UNITED STATES PATENTS

| 2,014,854 | Lothrop | Sept. 17, 1935 |
| 2,154,303 | Cooper | Apr. 11, 1939 |
| 2,474,316 | May et al. | June 28, 1949 |

FOREIGN PATENTS

| 749,210 | Germany | Nov. 17, 1944 |